United States Patent
Haraguchi et al.

(10) Patent No.: US 10,253,756 B2
(45) Date of Patent: Apr. 9, 2019

(54) LASER RADAR DEVICE AND WIND TURBINE CONTROL SYSTEM

(71) Applicant: Mitsubishi Electric Corporation, Chiyoda-ku (JP)

(72) Inventors: Eisuke Haraguchi, Tokyo (JP); Toshiyuki Ando, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/072,233

(22) PCT Filed: Feb. 5, 2016

(86) PCT No.: PCT/JP2016/053525
§ 371 (c)(1),
(2) Date: Jul. 24, 2018

(87) PCT Pub. No.: WO2017/134821
PCT Pub. Date: Aug. 10, 2017

(65) Prior Publication Data
US 2019/0032635 A1   Jan. 31, 2019

(51) Int. Cl.
*G01C 3/08* (2006.01)
*F03D 7/02* (2006.01)
(Continued)

(52) U.S. Cl.
CPC .......... *F03D 7/026* (2013.01); *F03D 17/00* (2016.05); *G01S 17/95* (2013.01);
(Continued)

(58) Field of Classification Search
CPC .......... F03D 7/026; F03D 17/00; G01S 17/95; F05B 2270/32; F05B 2270/327; F05B 2270/8042
See application file for complete search history.

(56) References Cited

U.S. PATENT DOCUMENTS

| | | | |
|---|---|---|---|
| 4,743,110 A | 5/1988 | Arnaud et al. | |
| 5,347,525 A * | 9/1994 | Faris | H04B 10/50 372/18 |

(Continued)

FOREIGN PATENT DOCUMENTS

| | | |
|---|---|---|
| JP | 2004-285991 A | 10/2004 |
| JP | 4236969 B2 | 3/2009 |

(Continued)

OTHER PUBLICATIONS

International Search Report dated Apr. 26, 2016 in PCT/JP2016/053525 filed Feb. 5, 2016.

(Continued)

*Primary Examiner* — Samantha K Abraham
(74) *Attorney, Agent, or Firm* — Oblon, McClelland, Maier & Neustadt L.L.P.

(57) ABSTRACT

A configuration is provided which includes: a reference light source to emit laser light; an optical phase modulator to perform phase modulation of transmission light of the laser light on the basis of a linear-phase-modulation signal having a first frequency component and a second frequency component; an optical intensity modulator to modulate light intensity of the transmission light on the basis of a pulsed light generation signal for generation of pulsed light; first and second optical antennas to emit the transmission light to a space and receive reflected light from a first point and a second point; an optical receiver to perform heterodyne detection on light obtained by mixing received light and local oscillation light; and a signal processor to separate a received signal on the basis of the first and the second frequency components.

17 Claims, 15 Drawing Sheets

(51) Int. Cl.
*F03D 17/00* (2016.01)
*G01S 17/95* (2006.01)
(52) U.S. Cl.
CPC ..... *F05B 2270/32* (2013.01); *F05B 2270/327* (2013.01); *F05B 2270/8042* (2013.01)

(56) References Cited

U.S. PATENT DOCUMENTS

| | | | |
|---|---|---|---|
| 6,256,130 B1* | 7/2001 | Bulow | H04B 10/505 |
| | | | 398/141 |
| 6,580,497 B1* | 6/2003 | Asaka | G01S 7/481 |
| | | | 356/28.5 |
| 2005/0213075 A1 | 9/2005 | Cooke | |
| 2009/0297155 A1* | 12/2009 | Weiner | H04B 1/40 |
| | | | 398/115 |
| 2011/0116074 A1 | 5/2011 | Valla et al. | |
| 2014/0376001 A1 | 12/2014 | Swanson | |

FOREIGN PATENT DOCUMENTS

| | | |
|---|---|---|
| JP | 2014-66548 A | 4/2014 |
| WO | WO 03/100458 A1 | 12/2003 |

OTHER PUBLICATIONS

Kanno, A. et al., "16-Gbaud QPSK Radio Transmission using Optical Frequency Comb with Recirculating Frequency Shifter for 300-GHz RoF Signal," IEEE Conference Publications, MWP 2012, pp. 298-301.
Supplementary European Search Report dated Dec. 13, 2018 in European Patent Application No. 16889307.1, 8 pages.

* cited by examiner

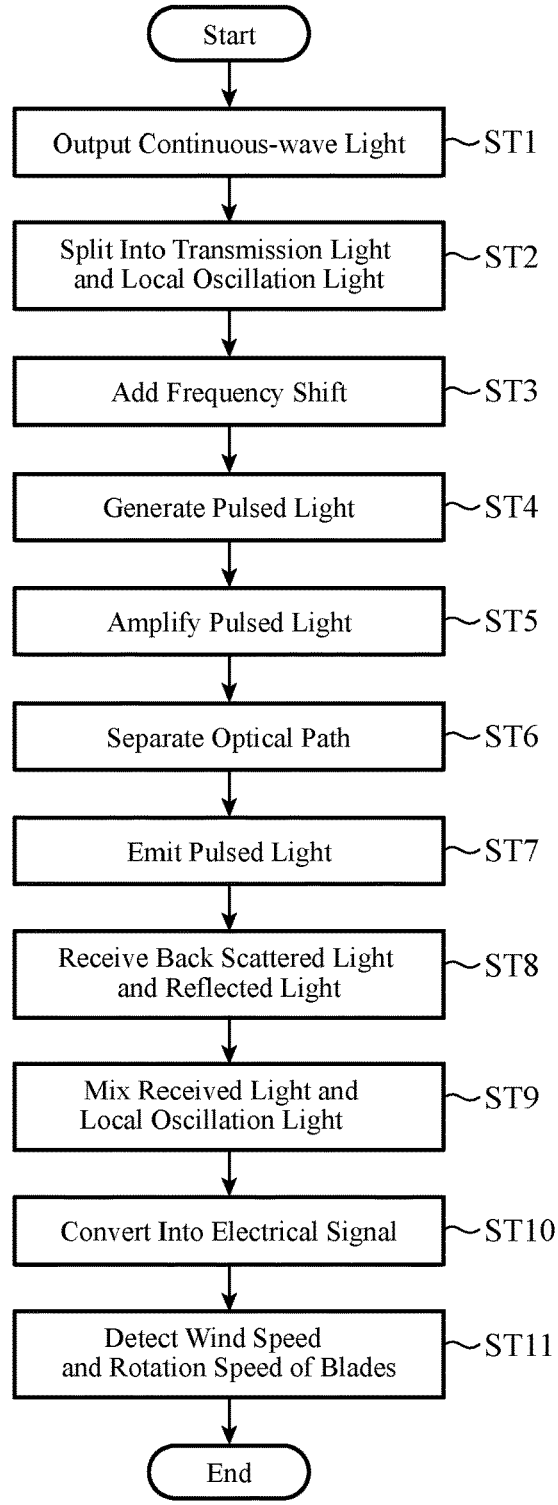

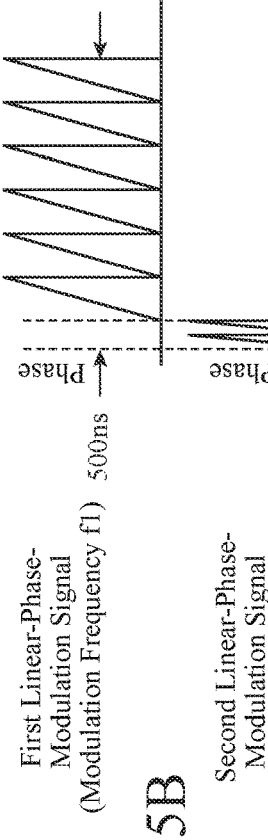
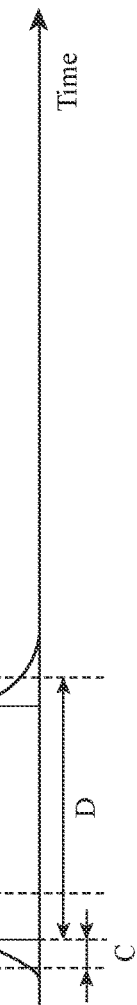
FIG. 5A First Linear-Phase-Modulation Signal (Modulation Frequency f1)
FIG. 5B Second Linear-Phase-Modulation Signal (Modulation Frequency f1)
FIG. 5C Burst Linear-Phase-Modulation Signal
FIG. 5D Pulse Generation Signal

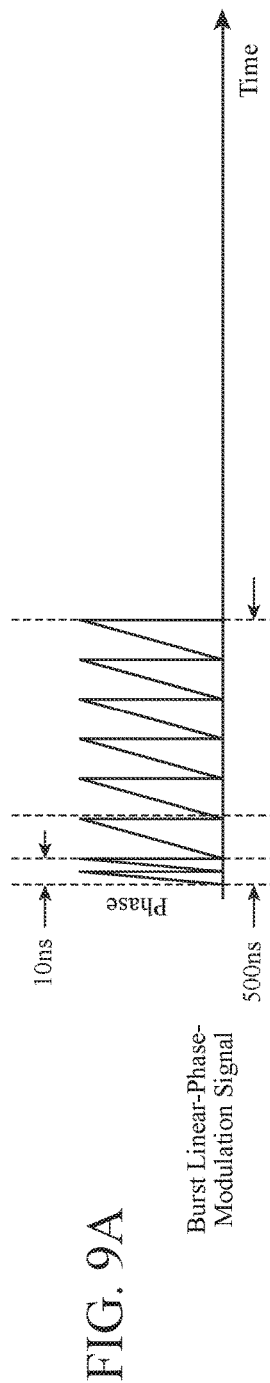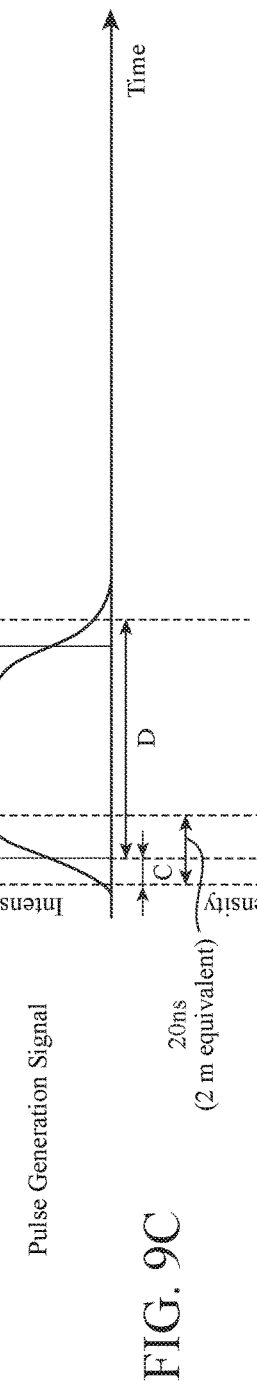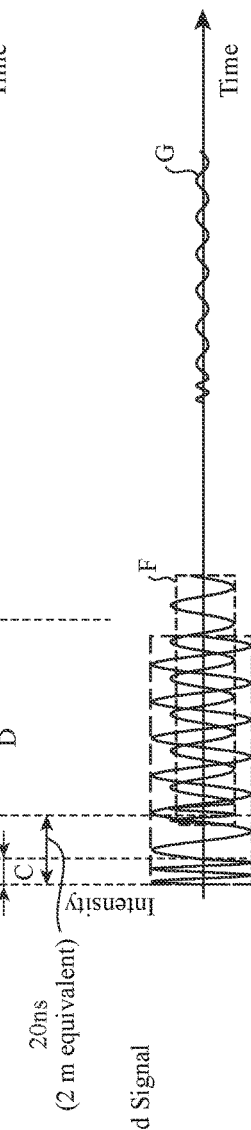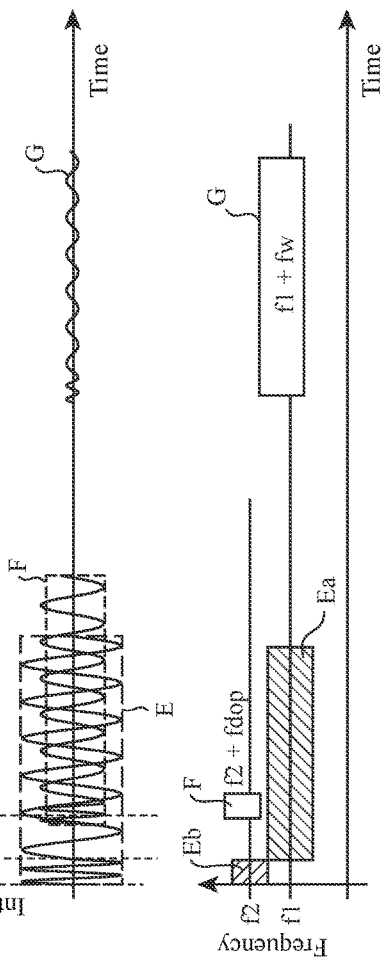
FIG. 9A  Burst Linear-Phase-Modulation Signal
FIG. 9B  Pulse Generation Signal
FIG. 9C  Received Signal
FIG. 9D  Received Signal

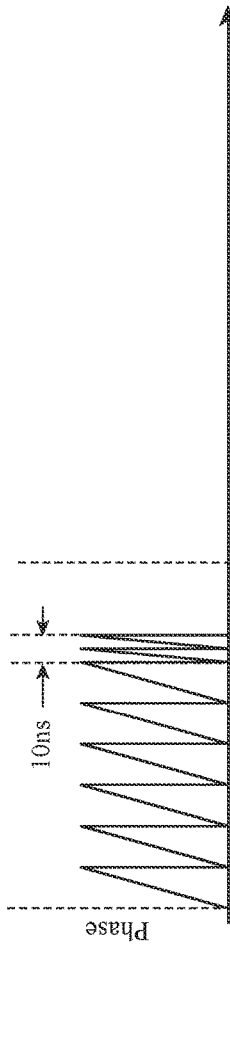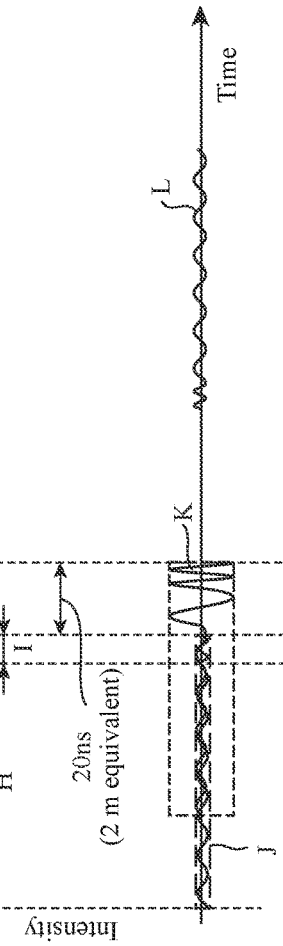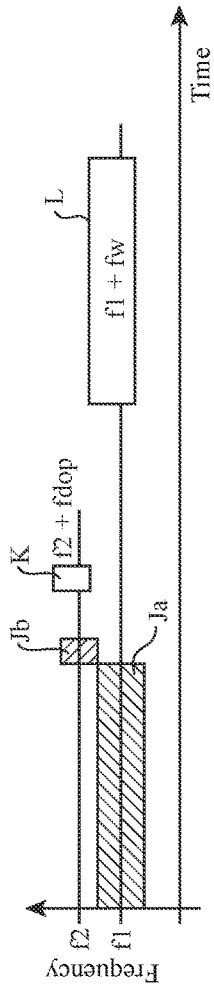
FIG. 13A Burst Linear-Phase-Modulation Signal
FIG. 13B Pulse Generation Signal
FIG. 13C Received Signal
FIG. 13D Received Signal

LASER RADAR DEVICE AND WIND TURBINE CONTROL SYSTEM

TECHNICAL FIELD

The present disclosure relates to a technique for measuring a wind speed and wind direction in a space using laser light.

BACKGROUND ART

Laser radar devices are known which calculate a travelling speed of aerosol from a spectrum, that is, a wind speed in a laser emission direction by applying a predetermined frequency shift to laser light emitted from a light source, emitting pulsed light, which is pulse-modulated, to the atmosphere via an optical antenna, receiving scattered light which is the pulsed light emitted to the atmosphere and reflected by fine liquid or solid particles (hereinafter referred to as aerosol) floating in the atmosphere and thereby returns, and performing frequency analysis on a digital signal of a signal of the received light.

There are cases where the laser radar devices described above are applied to wind turbines for wind power generation. In a wind turbine for wind power generation, in order to increase the operation rate of wind power generation, a configuration that is easily started even under a wind speed condition of a gentle wind is required. For example, Patent Literature 1 discloses a startup assist control device of a wind turbine that turns on a startup assistance current supplying system when the wind turbine is not rotating and turns off the startup assistance current supplying system when the wind turbine rotates at the speed of rotation greater than or equal to a certain speed by wind power. Furthermore, Patent Literature 1 discloses a technique that employs the wind speed as a control element in addition to the speed of rotation of the wind turbine and turns on the startup assistance current supplying system when the wind turbine is not rotating and the wind speed is greater than or equal to a startup wind speed of the wind turbine.

CITATION LIST

Patent Literatures

Patent Literature 1: Japanese Patent Application Publication No. 2004-285991.

SUMMARY OF INVENTION

Technical Problem

However, since the startup assistance current supplying system is turned on when the wind turbine is not rotating in the technique disclosed in Patent Literature 1 described above, there is the problem that the current supply for startup assistance is uninterruptedly turned on even when the wind speed is less than or equal to the startup wind speed of the wind turbine, thus wasting power. Furthermore, there is the problem that it is necessary to provide a rotation-speed detection circuit for detecting rotation of the wind turbine.

Moreover, in a case where the speed of rotation of the wind turbine and the wind speed at the position of the wind turbine are detected in the laser radar device, the measurement resolution of a pulse type Doppler lidar which measures the wind speed at the position of the wind turbine is limited by the pulse width of transmission light, and the minimum distance that enables measurement is limited by leakage light of transmission pulsed light generated in the pulse type Doppler lidar. Therefore, it is difficult to detect the speed of rotation of the wind turbine and the wind speed at the position of the wind turbine by measurement within one pulse of the laser radar device, and thus there is a problem that the measurement resolution is limited.

The present disclosure has been made to solve the above problems, and it is an object of the present disclosure to enable frequency analysis on two frequency components within one pulse and to improve measurement resolution of the laser radar device within one pulse of transmission light.

Solution to Problem

A laser radar device according to the present disclosure includes: a reference light source to emit laser light; an optical splitting coupler to split the laser light into transmission light and local oscillation light an optical phase modulator to perform phase modulation of the transmission light on the basis of a first linear-phase-modulation signal having a first frequency component and a second linear-phase-modulation signal having a second frequency component in a time section that is different from a time section of the first linear-phase-modulation signal; an optical intensity modulator to modulate light intensity of the transmission light that has been subjected to the phase modulation by the optical phase modulator, on the basis of a pulsed-light generation signal for generation of pulsed light; an optical antenna to emit toward a space the transmission light whose light intensity has been modulated by the optical intensity modulator, and to receive reflected light generated from the emitted transmission light being reflected at a first point and a second point; an optical receiver to perform heterodyne detection on light generated by mixing the received light received by the optical antenna and the local oscillation light; and a signal processor to separate received signal obtained by the heterodyne detection in the optical receiver on the basis of the first frequency component and the second frequency component, and to perform frequency analysis of the reflected light at the first point and the second point.

Advantageous Effects of Invention

According to the present disclosure, it is possible to improve measurement resolution within one pulse of transmission light of a laser radar device.

BRIEF DESCRIPTION OF DRAWINGS

FIG. 4 is a flowchart illustrating the operation of the laser radar device according to the first embodiment.

FIGS. 5A to 5D are explanatory diagrams illustrating phase modulation and intensity modulation of a modulator of the laser radar device according to the first embodiment.

FIGS. 9A to 9D are diagrams each illustrating an image of time-series data of one of modulated signals and received signals of the laser radar device according to the first embodiment.

FIGS. 13A to 13D are diagrams each illustrating an image of time-series data of one of modulated signals and received signals of the laser radar device according to the second embodiment.

DESCRIPTION OF EMBODIMENTS

To describe the disclosure further in detail, embodiments for carrying out the disclosure are described below along the accompanying drawings.

First Embodiment

Figure 1:
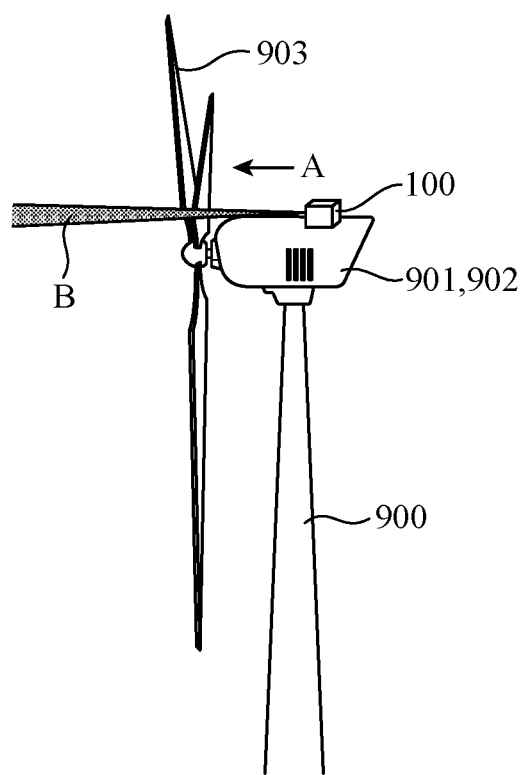
FIG. 1 is a diagram illustrating an application example of a laser radar device according to a first embodiment to a wind turbine.

FIG. 1 is a diagram illustrating an application example of a laser radar device 100 according to a first embodiment to a wind turbine 900.

The wind turbine 900 has a control device 901 and a driving device 902 at the top, and blades 903 are rotatably connected to a front end of the control device 901 and the driving device 902. When the wind arrives at the wind turbine 900, the blades 903 rotate and power generation is performed. In order to improve the power generation efficiency of the wind turbine 900, when the blades 903 are not rotating and a gentle wind arrives at the wind turbine 900, the control device 901 performs control to apply a current for startup assistance, and the driving device 902 assists a startup of the blades 903 by applying the current under control by the control device 901. When the speed of rotation of the blades 903 reaches a certain speed, the control device 901 performs control to shut off the current for startup assistance.

In order to perform the above-described control, the laser radar device 100 according to the first embodiment detects the wind speed at the position of the wind turbine (first point) and the rotation speed of the blades 903 (second point). Detection of the rotation speed of the blades 903 is performed at a point closer to the laser radar device 100 than the point where the wind speed is measured. Hereinafter, the measurement point of the wind speed is referred to as a long-distance point, and the measurement point of the rotation speed of the blades is referred to as a short distance point.

The laser radar device 100 connected to the control device 901 outputs transmission light B in a direction of an arrow A. The output transmission light B is reflected by the blades 903 located at the short distance point and received by the laser radar device 100 as reflected light. Furthermore, the output transmission light B is reflected by aerosol located at the long-distance point and travelling on the wind in the atmosphere and received by the laser radar device 100 as back scattered light. The laser radar device 100 measures the rotation speed of the blades by performing signal processing on the received reflected light and measures the wind speed at the position of the wind turbine by performing signal processing on the received back scattered light. A detailed configuration of the laser radar device 100 is described below.

Figure 2:
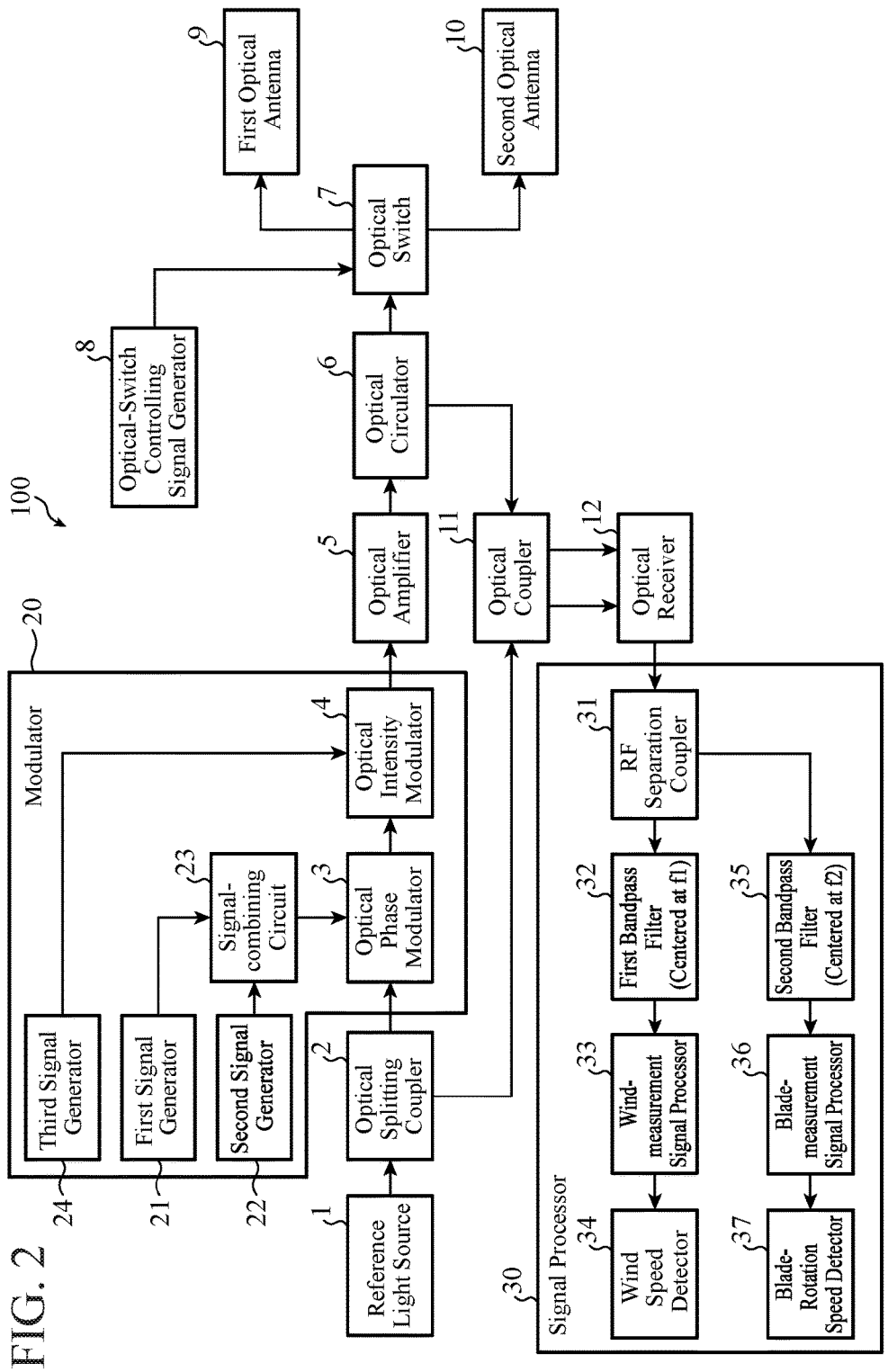
FIG. 2 is a block diagram illustrating a configuration of the laser radar device according to the first embodiment.

FIG. 2 is a block diagram illustrating a configuration of the laser radar device 100 according to the first embodiment of the disclosure.

The laser radar device 100 includes a reference light source 1, an optical splitting coupler 2, an optical phase modulator 3, an optical intensity modulator 4, an optical amplifier 5, an optical circulator 6, an optical switch 7, an optical-switch controlling signal generator 8, a first optical antenna 9, a second optical antenna 10, an optical coupler 11, an optical receiver 12, a modulator 20, and a signal processor 30. In the block diagram illustrated in FIG. 2, the optical phase modulator 3 and the optical intensity modulator 4 are also included in the modulator 20.

The reference light source 1 is a device that emits continuous-wave light (laser light) of a single frequency which is called reference light. The optical splitting coupler 2 splits the continuous-wave light emitted by the reference light source 1 into two beams of transmission light and local oscillation light. The transmission light generated by the splitting is output to the optical phase modulator 3 on the optical-path side for transmission, and the local oscillation light is output to the optical coupler 11 on the local optical-path side. The optical phase modulator 3 adds a predetermined frequency shift to the transmission light output from the optical splitting coupler 2. For example, the optical phase modulator 3 is composed of lithium niobate (LN) crystal and performs phase modulation at a high rate by utilizing a change in the refractive index of a propagation optical path based on the principle of electro-optical effects. The optical intensity modulator 4 generates pulsed light by pulse-modulating the transmission light after the frequency shift. As the optical intensity modulator 4, a semiconductor optical amplifier, a Mach-Zehnder intensity modulator, or the like can be applied. The optical amplifier 5 amplifies the generated pulsed light. As the optical amplifier 5, an erbium-doped fiber amplifier (EDFA) or other amplifiers can be applied.

The optical circulator 6 is a device that separates the optical path into an optical path for transmission and an optical path for reception. The optical circulator 6 outputs the pulsed light amplified by the optical amplifier 5 to the first optical antenna 9 and the second optical antenna 10 as transmission light via the optical switch 7. Furthermore, the optical circulator 6 provides the reflected light and the back scattered light (pulsed light) received by the first optical antenna 9 and the second optical antenna 10 to the optical coupler 11 as received light. The optical switch 7 separates the optical path for transmission into an optical path for output to the first optical antenna 9 and an optical path for output to the second optical antenna 10. The optical-switch controlling signal generator 8 generates a control signal for driving the optical switch 7.

The first optical antenna 9 and the second optical antenna 10 emit, to the atmosphere, transmission light input from the optical paths separated by the optical switch 7. Furthermore, the first optical antenna 9 and the second optical antenna 10 receive back scattered light, which is transmission light having been transmitted and reflected by aerosol present in the atmosphere and thereby returns, and reflected light reflected by the blades 903. The optical coupler 11 mixes the local oscillation light obtained by the splitting in the optical splitting coupler 2 and the received light obtained by the separation in the optical circulator 6. The optical receiver 12 converts the optical signal obtained by the mixing in the optical coupler 11 into an electrical signal and receives the electrical signal in a heterodyne manner.

In addition to the optical phase modulator 3 and the optical intensity modulator 4, the modulator 20 includes a first signal generator 21, a second signal generator 22, a signal-combining circuit 23, and a third signal generator 24.

The first signal generator 21 generates a first linear-phase-modulation signal (one cycle=1/f1) corresponding to a modulation frequency f1 as a burst pulse. The second signal generator 22 generates a second linear-phase-modulation signal (cycle=1/f2) corresponding to a modulation frequency f2 as a burst pulse. The signal-combining circuit 23 combines the first linear-phase-modulation signal generated by the first signal generator 21 and the second linear-phase-modulation signal generated by the second signal generator 22 with each other, to generate a burst linear-phase-modulation signal having two frequency components. In the burst linear-phase-modulation signal, the modulation frequency f2 is set in a rising region of pulses while the modulation frequency f1 is set in the main region of pulses. The signal-combining circuit 23 applies the generated burst linear-phase-modulation signal having the two frequency components to the optical phase modulator 3.

The third signal generator 24 generates a pulse generation signal instructing generation of pulsed light in which frequency components of the modulation frequency f1 and the modulation frequency f2 have different pulse widths and applies the pulse generation signal to the optical intensity modulator 4.

The signal processor 30 includes an RF separation coupler 31, a first bandpass filter 32, a wind-measurement signal processor 33, a wind speed detector 34, a second bandpass filter 35, a blade-measurement signal processor 36, and a blade-rotation speed detector 37.

The RF separation coupler 31 separates the received signal of the optical receiver 12 into two received signals, inputs one of the two received signals to the first bandpass filter 32, and inputs the other of the two received signals to the second bandpass filter 35. The first bandpass filter 32 passes a received signal of a frequency band centered at the modulation frequency f1. The wind-measurement signal processor 33 performs A/D conversion on the received signal centered at the modulation frequency f1 that has passed through the first bandpass filter 32, and calculates a Doppler frequency shift caused by the wind. The wind speed detector 34 detects the wind speed from the Doppler frequency shift calculated by the wind-measurement signal processor 33.

The second bandpass filter 35 passes a received signal of a frequency band centered at the modulation frequency f2. The blade-measurement signal processor 36 performs A/D conversion on the received signal centered at the modulation frequency f2 that has passed through the second bandpass filter 35, and calculates a Doppler shift component caused by the blades 903 of the wind turbine 900. The blade-rotation speed detector 37 detects the rotation speed of the blades from the Doppler shift component calculated by the blade-measurement signal processor 36.

Figure 3:
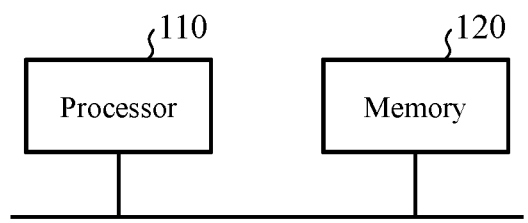
FIG. 3 is a block diagram illustrating a hardware configuration of the laser radar device according to the first embodiment.

FIG. 3 is a block diagram illustrating a hardware configuration of the laser radar device 100 according to the first embodiment.

The first signal generator 21, the second signal generator 22, the signal-combining circuit 23 and the third signal generator 24 included in the modulator 20 as well as the wind-measurement signal processor 33, the wind speed detector 34, the blade-measurement signal processor 36, and the blade-rotation speed detector 37 included in the signal processor 30 are implemented by a processor 110 executing a program stored in a memory 120. Furthermore, a plurality of processors 110 and a plurality of memories 120 may cooperate to execute the above-described functions.

Next, the operation of the laser radar device 100 is described.

FIG. 4 is a flowchart illustrating the operation of the laser radar device 100 according to the first embodiment.

When continuous-wave light is output from the reference light source 1 included in the laser radar device 100 (step ST1), the optical splitting coupler 2 splits the continuous-wave light into transmission light and local oscillation light (step ST2). The optical phase modulator 3 applies two forms of frequency shifts separated in time from each other, to the transmission light split in step ST2 (step ST3). Here, the two forms of frequency shifts to be applied which are separated in time from each other are included in a burst linear-phase-modulation signal generated by the first signal generator 21, the second signal generator 22, and the signal-combining circuit 23. Their details are described later.

The optical intensity modulator 4 generates pulsed light by applying a pulse generation signal generated by the third signal generator 24 to the transmission light frequency-shifted in step ST3 and thereby performing pulse modulation (step ST4). The optical amplifier 5 amplifies the pulsed light generated in step ST4 and inputs the pulsed light to the optical switch 7 via the optical circulator 6 (step ST5). The optical switch 7 separates the optical path in accordance with a control signal generated by the optical-switch controlling signal generator 8 (step ST6). The first optical antenna 9 and the second optical antenna 10 emit, to the atmosphere, pulsed light which has propagated through the optical paths formed by the separating in step ST6 (step ST7).

The first optical antenna 9 and the second optical antenna 10 receive, as received light, back scattered light which is the transmission light having been emitted in step ST7 and reflected by aerosol in the atmosphere and reflected light which is that reflected by the blades 903 (step ST8). The received light is input to the optical coupler 11 via the optical switch 7 and the optical circulator 6, and the optical coupler 11 mixes the input received light and the local oscillation light obtained by the separation in step ST2 (step ST9). The optical receiver 12 converts the optical signal obtained by the mixing in step ST9, into an electrical signal (step ST10). The signal processor 30 detects the wind speed at the position of the wind turbine and the rotation speed of the blades 903 on the basis of the optical signal converted into the electrical signal at step ST10 (step ST11), and terminates the processing.

In the above description of the flowchart, it is assumed that emission light and received light are determined in advance for the first optical antenna 9 and the second optical antenna 10 such as that, as step ST7, in a case where the first optical antenna 9 emits pulsed light for wind measurement and the second optical antenna 10 emits pulsed light for measurement of rotation of the blades, the first optical antenna 9 receives back scattered light reflected by aerosol in the atmosphere, and the second optical antenna 10 receives reflected light reflected by the blades 903 in step ST8.

With respect to phase modulation which is processing to add a frequency shift in step ST3 of the flowchart of FIG. 4 described above and intensity modulation which is processing to apply the pulse generation signal described in step ST4, the details are described with reference to FIGS. 5A to 5D. In FIGS. 5A to 5C, a horizontal axis represents time, and a vertical axis represents phase. In FIG. 5D, a horizontal axis represents time, and a vertical axis represents intensity.

In the following description, an example where pulsed light having a pulse width of 500 ns is output from the optical intensity modulator 4 is described.

The first signal generator 21 generates the first linear-phase-modulation signal (one cycle=1/f1) corresponding to the modulation frequency f1 for measurement of the wind and outputs the first linear-phase-modulation signal to the signal-combining circuit 23 as a burst pulse. An example of the first linear-phase-modulation signal is illustrated in FIG. 5A. In the example of FIG. 5A, output time of the first linear-phase-modulation signal ranges from 10 ns to 500 ns.

The second signal generator 22 generates the second linear-phase-modulation signal (one cycle=1/f2) corresponding to the modulation frequency f2 for measurement of rotation of the blades and outputs the second linear-phase-modulation signal to the signal-combining circuit 23. An example of the second linear-phase-modulation signal is illustrated in FIG. 5B. In the example of FIG. 5B, output time of the second linear-phase-modulation signal ranges from 0 ns to 10 ns. The pulse width of the second linear-phase-modulation signal is set depending on the distance from the laser radar device 100 to the blades 903.

The signal-combining circuit 23 generates the burst linear-phase-modulation signal having a pulse width of 500 ns and the two frequency components illustrated in FIG. 5C by adding the first linear-phase-modulation signal illustrated in FIG. 5A and the second linear-phase-modulation signal illustrated in FIG. 5B.

The third signal generator 24 generates a pulse generation signal for performing intensity modulation on the transmission light output from the optical phase modulator 3 and applies the pulse generation signal to the optical intensity modulator 4. An example of a pulse generation signal is illustrated in FIG. 5D. The pulse generation signal illustrated in FIG. 5D is an intensity modulated signal which allows the pulsed light output from the optical intensity modulator 4 to have a light intensity within a range of output time from 0 ns to 500 ns. In the example illustrated in FIG. 5D, no pulsed light is generated in a range C of output time from 0 ns to 10 ns in the related art. In the laser radar device 100 of the present disclosure, however, since pulsed light in the range C is used for measurement of rotation of the blades, an intensity modulated signal is generated also in the range of the output time from 0 ns to 10 ns. A range D in FIG. 5D represents an intensity modulated signal for generating pulsed light used for wind measurement.

Figure 6:
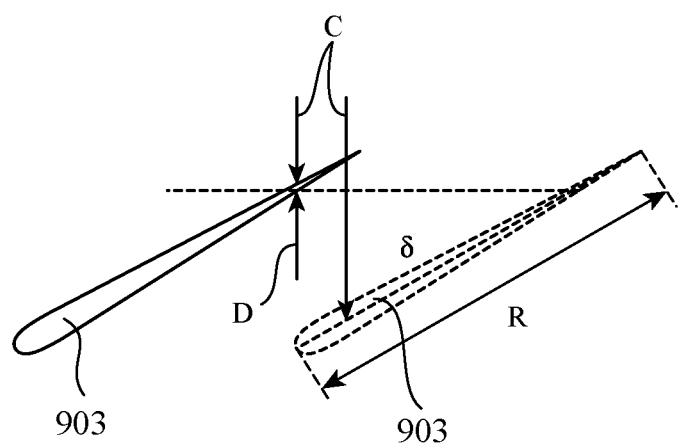
FIG. 6 is a diagram for explaining a Doppler shift component generated by a blade of a wind turbine.

Next, with reference to FIG. 6, a Doppler shift component generated by the blades 903 of the wind turbine 900 is described. FIG. 6 is illustrated using one of the blades 903 illustrated in FIG. 1.

Denoting the rotation speed of the blades 903 by ω, the passing speed of the blades 903 by Vhub, the inclination of the blades 903 by δ, and the radius of the blades 903 by R, the Doppler speed Vdop generated by rotation of the blades 903 is expressed by the following mathematical formulas (1).

$$Vhub = 2\Pi\omega/60R$$

$$Vdop = Vhub \times \tan \delta \quad (1)$$

For example, assuming that the rotation speed of the blades 903 is expressed as ω=16 to 49 [rpm] and the pitch angle of the blades 903 is 5 to 10 degrees, the Doppler speed Vdop is calculated to be about 0.33 to 2.11 [m/s]. Therefore, the Doppler shift component fdop to be detected is estimated to be less than 3 [MHz].

As illustrated in FIG. 6, the blades 903 is formed to have a pitch angle δ to obtain lift produced by wind power. Because the blades 903 are arranged to face the direction of arrival of the wind, the inclination of the blades 903 is an inclination with respect to the direction of arrival of the wind and a direction orthogonal to the main body of the wind turbine 900, that is, the pitch angle δ.

An arrow C in FIG. 6 indicates transmission light, and an arrow D indicates the Doppler shift component fdop.

Received light received by the first optical antenna 9 and the second optical antenna 10 includes first received light used for wind measurement and second received light used for measurement of rotation of the blades. Here, an example is described where the first optical antenna 9 receives the first received light used for wind measurement and the second optical antenna 10 receives the second received light used for measurement of rotation of the blades.

First, a frequency of the first received light used for wind measurement is added with a Doppler shift component fw caused by the wind speed. Therefore, the frequency of the first received light received by the first optical antenna 9 is expressed by f0+f1+fw. On the other hand, a frequency of the second received light used for measurement of rotation of the blades is added with the Doppler shift component fdop caused by the blades 903 described above. Therefore, the frequency of the second received light received by the second optical antenna 10 is expressed by f0+f2+fdop. Here, f0 is a frequency of the reference light emitted by the reference light source 1.

The operation of the signal processor 30 using the first received light and the second received light described above is described. Processing of steps ST8 to ST11 in the flowchart of FIG. 4 described above is described in more detail with reference to a flowchart of FIG. 7.

Figure 7:
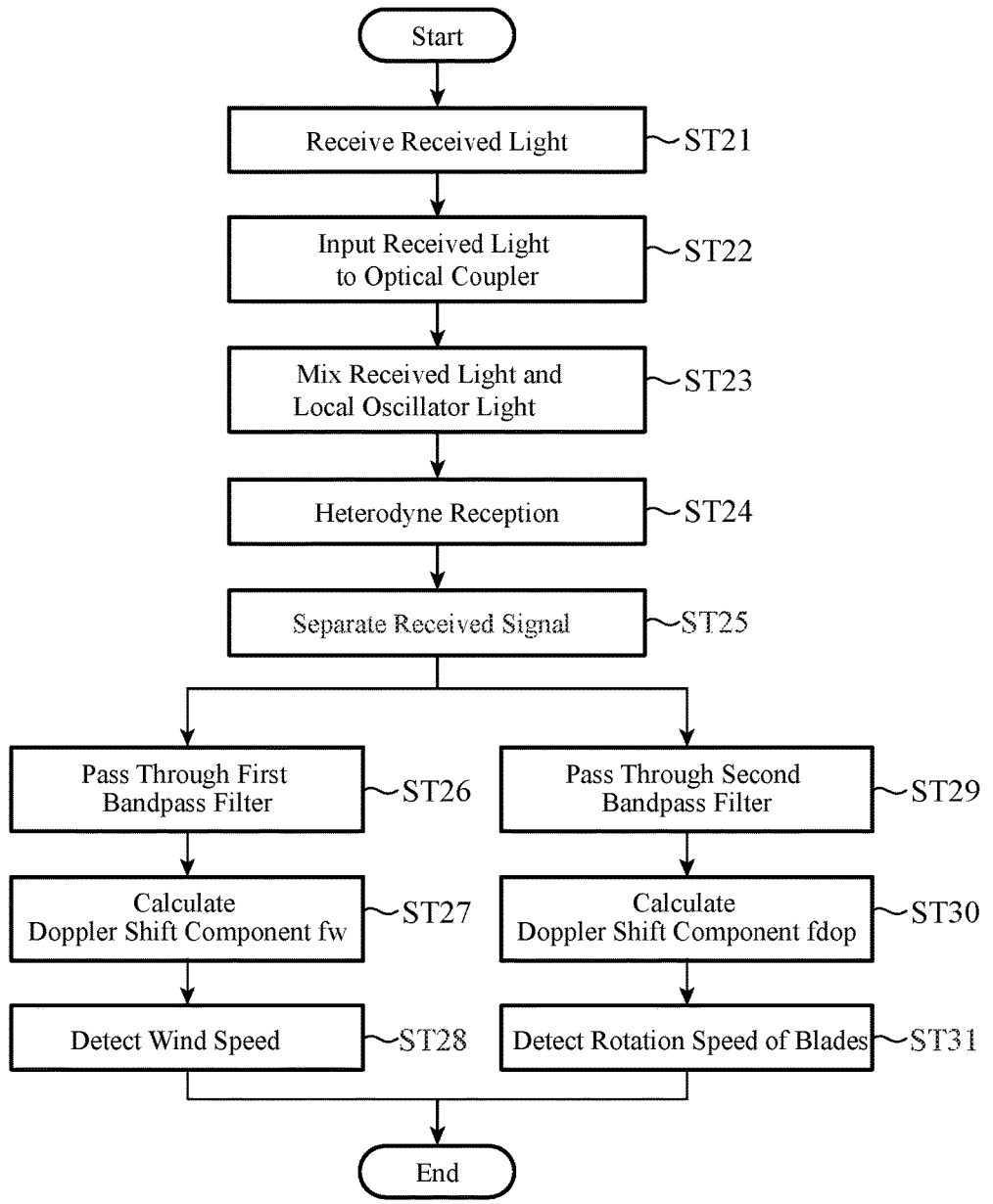
FIG. 7 is a flowchart illustrating operations for received light in the laser radar device according to the first embodiment.

FIG. 7 is a flowchart illustrating operations for received light in the laser radar device 100 according to the first embodiment.

When the first optical antenna 9 receives the first received light and the second optical antenna 10 receives the second received light (step ST21), the first received light and the second received light are separated from a transmission circuit at the optical circulator 6 and input to the optical coupler 11 (step ST22). The optical coupler 11 mixes the local oscillation light with the first received light and second received light input thereto (step ST23). Processing of step ST22 and step ST23 corresponds to the processing of step ST9 in the flowchart of FIG. 4.

The optical receiver 12 performs heterodyne-reception of the first received light and the second received light which are mixed in step ST23 (step ST24). In the heterodyne-reception in the optical receiver 12, processing to generate an electrical signal corresponding to a light intensity of a differential frequency component between the first received light and the local oscillation light is performed first. The differential frequency component between the first received light and the local oscillation light received by the optical receiver 12 is expressed as f1+fw. Similarly, processing for generating an electrical signal corresponding to the light intensity of the differential frequency component between the second received light and the local oscillation light is performed. The differential frequency component between the second received light and local oscillation light received by the optical receiver 12 is expressed as f2+fdop. In this regard, processing of step ST24 corresponds to the processing of step ST10 in the flowchart of FIG. 4.

The RF separation coupler 31 separates the electrical signal obtained by the heterodyne-reception in the optical receiver 12, into two electrical signals, and outputs the electrical signals to the first bandpass filter 32 and the second bandpass filter 35 (step ST25). The first bandpass filter 32 passes an electrical signal having the modulation frequency f1 as the central band thereof (step ST26). The wind-measurement signal processor 33 performs Fourier transform on the electrical signal having the modulation frequency f1 as the central band and calculates the Doppler shift component fw which is information indicating the wind direction and the wind speed at the position of the wind turbine (step ST27). The wind speed detector 34 detects the wind speed at the position of the wind turbine from the Doppler shift component fw calculated by the wind-measurement signal processor 33 in step ST27 (step ST28).

In parallel with the processing from step ST26 to step ST28 described above, the second bandpass filter 35 passes an electrical signal having the modulation frequency f2 as the central band (step ST29). The blade-measurement signal processor 36 performs Fourier transform on the electrical signal having the modulation frequency f2 as the central band and calculates the Doppler shift component fdop of the blades 903 which is information indicating rotation of the blades 903 (step ST30). The blade-rotation speed detector 37 detects the rotation speed of the blades 903 from the Doppler shift component fdop calculated in step ST30 (step ST31). When processing of step ST28 and step ST31 is performed, the signal processor 30 terminates the processing.

The processing from step ST25 to step ST31 described above corresponds to the processing of step ST11 in the flowchart of FIG. 4.

It is assumed that reception of the first received light and the second received light in step ST21 described above is performed by the first optical antenna 9 and the second optical antenna 10 continuously collecting received light during an off period of a pulse of transmission light.

Figure 8:
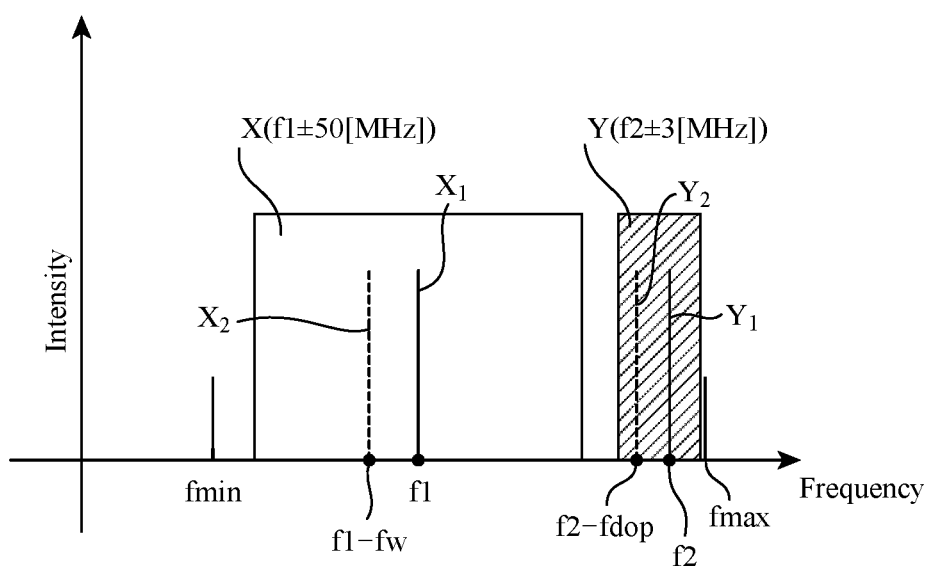
FIG. 8 is a diagram illustrating a spectrum image of the laser radar device according to the first embodiment.

A spectrum image of a heterodyne-detection received signal generated from transmission light, received light and local oscillation light of the laser radar device 100 is illustrated in FIG. 8.

In FIG. 8, a frequency region X represents a frequency region including the first transmission light and the first received light used for wind measurement. The frequency region X has a frequency range of f1±50 MHz.

The frequency region Y includes the second transmission light and the second received light used for measurement of rotation of the blades. The frequency region Y has a frequency range of f2±3 MHz. In the frequency region Y, a frequency range of the Doppler shift component fdop (e.g. <3 MHz) estimated from the Doppler speed Vdop generated by rotation of the blades 903 calculated on the basis of the above mathematical formulas (1) is applied.

The spectrum $X_1$ in the frequency region X is a spectrum having the modulation frequency f1 of the linear-phase-modulation signal generated by the first signal generator 21. The spectrum $X_1$ relates to the transmission light and the local oscillation light. The spectrum $X_2$ relates to a heterodyne-detection received signal having a modulation frequency of f1±fw heterodyne-received by the optical receiver 12. The spectrum $X_2$ is that of the received light and the local oscillation light, and the frequency is shifted to a low frequency side by the Doppler shift component fw caused by the wind.

Similarly, the spectrum $Y_1$ in the frequency region Y has the modulation frequency f2 of the linear-phase-modulation signal generated by the second signal generator 22. The spectrum $Y_1$ relates to the transmission light to the blades 903 and the local oscillation light. The spectrum $Y_2$ relates to a heterodyne-detection received signal having a modulation frequency of f2±fdop heterodyne-received by the optical receiver 12. The spectrum $Y_2$ relates to the received light by the blades 903 and the local oscillation light, and the frequency is shifted to a low frequency side by the Doppler shift component fdop caused by the blades 903.

FIGS. 9A to 9D are diagrams each illustrating an image of time-series data of one of modulated signals and received signals of the laser radar device 100 according to the first embodiment. FIG. 9A is the same as the time-series data of the modulation signal illustrated in FIG. 5C, and FIG. 9B is the same as the time-series data of light intensity illustrated in FIG. 5D. FIG. 9C is a diagram illustrating the intensity of a received signal of the laser radar device 100, and FIG. 9D is a diagram illustrating the received signal of the laser radar device 100 by frequency. In FIG. 9A, a horizontal axis represents time, and a vertical axis represents phase. In FIGS. 9B and 9C, a horizontal axis represents time, and a vertical axis represents intensity. In FIG. 9D, a horizontal axis represents time, and a vertical axis represents frequency.

As illustrated in FIGS. 9A and 9B, in a case where output time is within 0 ns to 10 ns, pulsed light for measurement of rotation of the blades is emitted, and in a case where output time is within 10 ns to 500 ns, pulsed light for measurement of the wind is emitted. The pulse width of 20 ns in FIG. 9 corresponds to a distance of 2 m and represents a time period from emission of the pulsed light emitted from the laser radar device 100 to reception of the reflected light reflected by the blades 903 by the laser radar device 100.

FIGS. 9A and 9B are the same data as that in FIGS. 5C and 5D, and thus descriptions thereof are omitted.

Leakage light E illustrated in FIG. 9C represents leakage light in the laser radar device 100, which is light emitted to an area other than an area to be irradiated, a received signal F represents reflected light reflected by the blades 903, and a received signal G represents scattered light scattered by aerosol in the atmosphere.

FIG. 9D illustrates leakage light and a received signal as separate components of the modulation frequency f1 and the modulation frequency f2. Leakage light Ea represents leakage light having the modulation frequency f1 in the leakage light E, and leakage light Eb represents leakage light having the modulation frequency f2 in the leakage light E. Since the received signal F indicates reflected light reflected by the blades 903, the received signal F has a modulation frequency of f2+fdop and is shifted to a high frequency side with respect to the leakage light Ea. Since the received signal G indicates scattered light scattered by aerosol, a modulation frequency of f1+fw is obtained.

In FIG. 9D, the leakage light Ea having the modulation frequency f2 is received only in a section of output time of 0 ns to 10 ns. This shows that the laser radar device 100 emits transmission light having the modulation frequency f2 in the section from 0 ns to 10 ns, which is not used for measurement of the wind in the related art. Therefore, transmission light in the section from 0 ns to 10 ns can be used for rotation measurement of the blades 903, and transmission light in a section of output time later than 10 ns can be used for measurement of the wind.

As described above, according to the first embodiment, the first linear-phase-modulation signal corresponding to the modulation frequency f1 and the second linear-phase-modulation signal corresponding to the modulation frequency f2 are combined, the burst linear-phase-modulation signal having the two frequency components are generated and applied to the optical phase modulator 3, and the pulse generation signal for instructing generation of pulsed light having two pulse widths of different frequency components is generated and applied to the optical intensity modulator 4. The modulator 20 is provided, which includes the optical phase modulator 3 that adds a frequency shift to transmission light on the basis of the burst linear-phase-modulation signal applied thereto, and the optical intensity modulator 4 that modulates the transmission light into pulses using the pulse generation signal applied thereto to generate pulsed light. Further, after the transmission light is emitted to the atmosphere, reflected light reflected by the blades 903 located at a short distance point from the laser radar device 100 and scattered light reflected by aerosol located at a long-distance point from the laser radar device 100 are received, the signal processor 30 performs frequency separation on a received signal, measures the wind speed from a received signal having the modulation frequency f1, and measures rotation of the blades 903 from a received signal having the modulation frequency f2. Therefore, this allows for variable modulation frequencies within one pulse of transmission light and for detection both at the short distance point and at the long-distance point by one pulse of transmission light. That is, it is possible to measure the speed of rotation of the wind turbine and to measure the wind speed at the position of the wind turbine only by the laser radar device. Therefore, it is possible to improve measurement resolution within one pulse of transmission light, thereby implementing a high resolution of the laser radar device.

Since it is possible to measure the rotation speed of the blades and the wind speed at the position of the wind turbine only by the laser radar device 100, applying the laser radar device of the present disclosure also to a wind turbine not equipped with a rotation measurement sensor of blades enables efficiently starting up the wind turbine at the time of a gentle wind, thus improving the efficiency of wind power generation.

Furthermore, according to the first embodiment, the modulator 20 includes the first signal generator 21 that generates the first linear-phase-modulation signal corresponding to the modulation frequency f1 as a burst pulse of the main region of the pulsed light, and a second signal generator 22 that generates the second linear-phase-modulation signal corresponding to the modulation frequency f2 as a burst pulse in a region where the energy of the pulsed light is small, that is, in the rising region of the pulsed light, which is not used for measurement in the related art. Therefore, the rising region of the pulsed light which is not used for measurement in the related art, that is, a region where the light intensity of the pulsed light is low can be used for measurement of rotation of the blades at the short distance point, and one pulse of the transmission light can be efficiently used.

Furthermore, the second linear-phase-modulation signal corresponding to the modulation frequency f2 is generated in the rising region within one pulse of the transmission light, and the first linear-phase-modulation signal corresponding to the modulation frequency f1 is generated in the main region according to the first embodiment. Therefore, although the reflected light from the blades of the wind turbine has a short measurement distance and return light occurs within one pulse of the transmission light, since the modulation frequency f1 component for wind measurement and the modulation frequency f2 component for measurement of rotation of the blades are different, frequency separation is enabled, which enables both wind measurement and rotation measurement by one pulse of transmission light.

Furthermore, since the blade-rotation speed detector 37, which detects the rotation speed of the blades using both the Doppler speed Vdop at the time when the blades pass, and the passing speed of the blades Vhub, is provided according to the first embodiment, it is possible to calculate the rotation speed of the blades with high accuracy. Moreover, since the rotation speed of the blades is calculated using two types of information, that is, a Doppler signal at the time when the blades pass and a passing interval of the blades, highly accurate calculation can be performed.

Furthermore, since a semiconductor optical amplifier is applied as the optical intensity modulator according to the first embodiment, loss of transmission light is suppressed in the optical intensity modulator, thereby enabling implementation of higher output of the laser radar device.

In the first embodiment described above, the case where two optical antennas composed of the first optical antenna 9 and the second optical antenna 10 are provided is described as an example (hereinafter this case is referred to as two lines of sight). There is no intention of limitation to the two lines of sight. The above technique can be applied to a single line of sight where an optical switch 7 is not provided, and applied to multiple lines of sight where the number of separate paths of the optical switch 7 are further increased. This can be similarly applied to second to fourth embodiments as described below.

Second Embodiment

In the first embodiment described above, the wind measurement and the measurement of rotation of the blades are implemented within one pulse by applying two types of modulated signals by applying a modulated signal for measurement of rotation of the blades to the rising region of pulses and applying a modulation signal for wind measurement to the main region of pulses in the burst linear phase modulation. In the second embodiment, however, a modulation signal having a frequency different from that of the main region of pulses is applied to a trailing region of pulses, and leakage light is suppressed by an RF switch.

Figure 10:
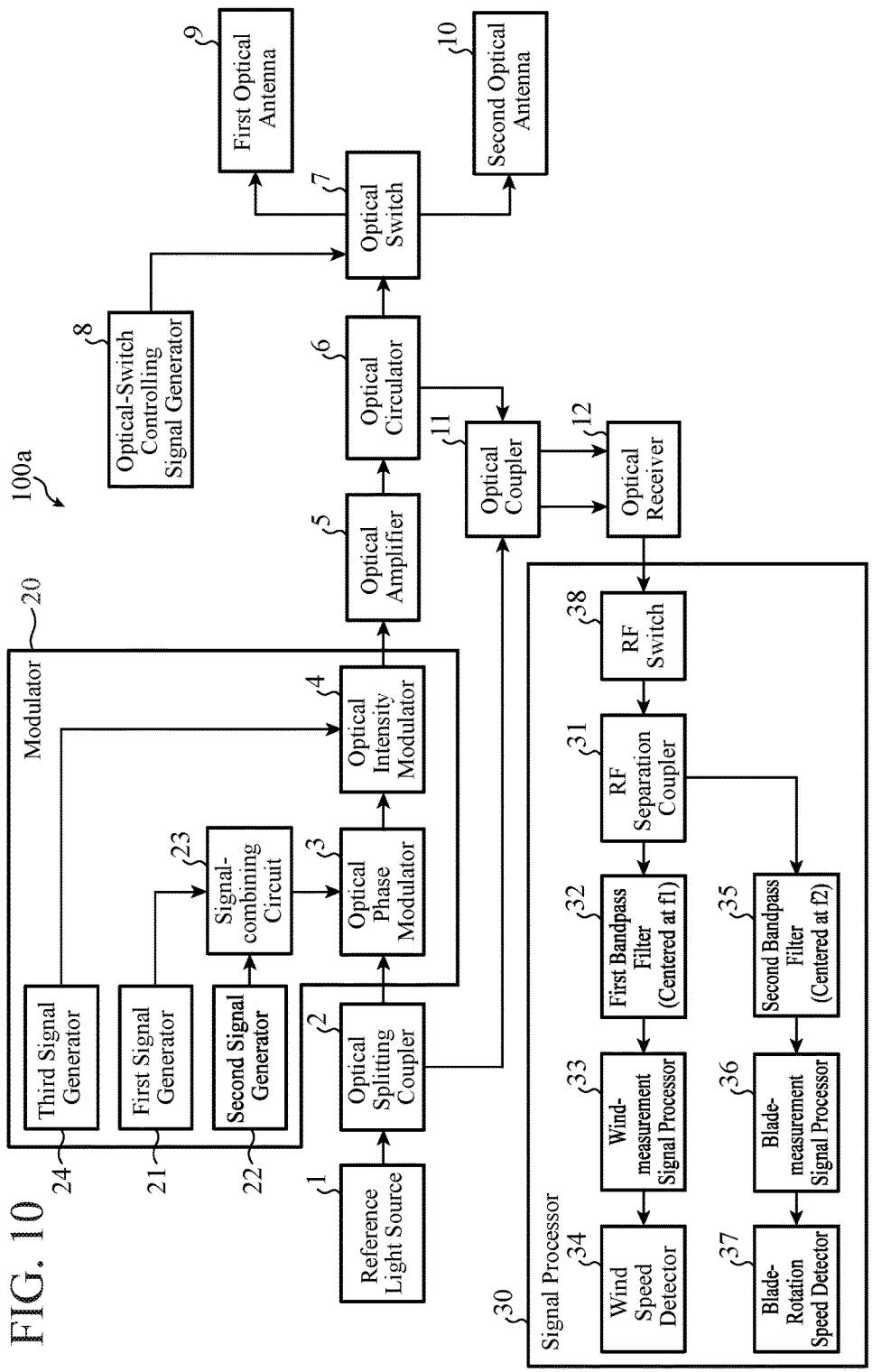
FIG. 10 is a block diagram illustrating a configuration of a laser radar device according to a second embodiment.

FIG. 10 is a block diagram illustrating a configuration of a laser radar device 100a according to the second embodiment.

In the second embodiment, an RF switch 38 is additionally included in the signal processor 30 of the laser radar device 100 described in the first embodiment to configure a signal processor 30a. In the following description, the same symbol as that used in the first embodiment is provided to the same or a corresponding component as that of the laser radar device 100 according to the first embodiment, and the explanation thereof is omitted or simplified.

A first signal generator 21 and a second signal generator 22 generate a first linear-phase-modulation signal and a second linear-phase-modulation signal like in the first embodiment. Like in the first embodiment, a signal-combining circuit 23 also combines the first linear-phase-modulation signal and the second linear-phase-modulation signal with each other to generate a burst linear-phase-modulation signal having two frequency components; however in the generated burst linear-phase-modulation signal, a modulation frequency f1 is set in the main region of pulses and a modulation frequency f2 is set in a trailing edge region of pulses. The point that the modulation frequency f2 is set in the trailing edge region of pulses is different from the first embodiment.

The RF switch 38 included in the signal processor 30a includes a switch for suppressing a received signal having a predetermined frequency from pulsed light of a received signal input from the optical receiver 12 and supplying a received signal of a frequency other than the predetermined frequency to an RF separation coupler 31. Specifically, when the frequency of a received signal is the same as the modulation frequency f1 or the modulation frequency f2 of a transmission signal, it is determined that the light is leakage light in the laser radar device 100a, and input of the pulsed light of the received signal input from the optical receiver 12 is suppressed.

Figure 11:
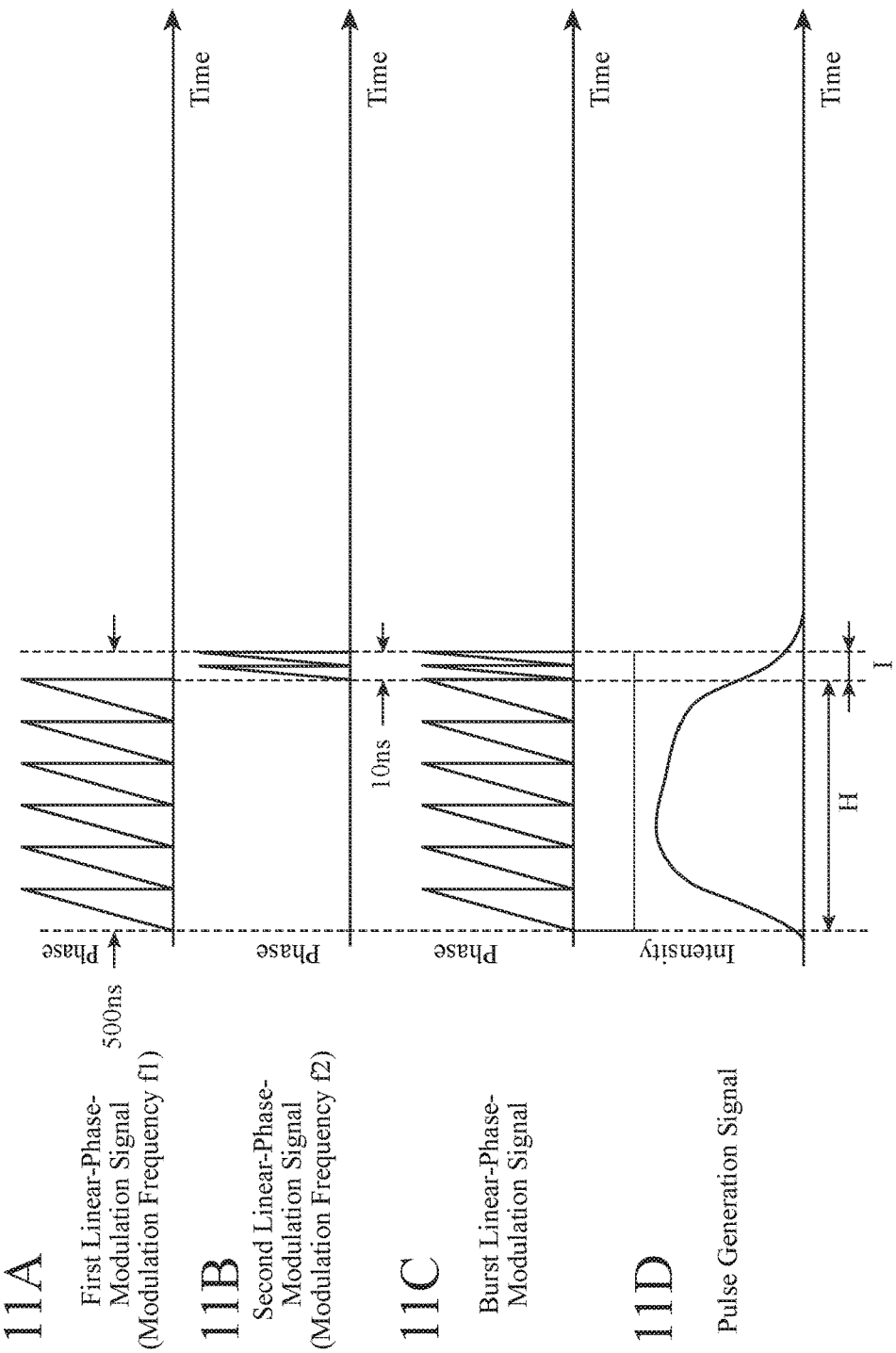
FIGS. 11A to 11D are explanatory diagrams illustrating phase modulation and intensity modulation of a modulator of the laser radar device according to the second embodiment.

Here, details of phase modulation which is an operation to add a frequency shift in a modulator 20 and intensity modulation which is an operation to apply a pulse generation signal are described with reference to FIG. 11A to FIG. 11D. In FIGS. 11A to 11C, a horizontal axis represents time, and a vertical axis represents phase. In FIG. 11D, a horizontal axis represents time, and a vertical axis represents intensity.

In the following description, an example where pulsed light having a pulse width of 500 ns is output from the optical intensity modulator 4 is described.

An example of the first linear-phase-modulation signal corresponding to the modulation frequency f1 generated by the first signal generator 21 is illustrated in FIG. 11A. In the example of FIG. 11A, output time of the first linear-phase-modulation signal ranges from 0 ns to 490 ns.

An example of the second linear-phase-modulation signal corresponding to the modulation frequency f2 generated by the second signal generator 22 is illustrated in FIG. 11B. In the example of FIG. 11B, output time of the second linear-phase-modulation signal ranges from 490 ns to 500 ns. The pulse width of the second linear-phase-modulation signal is set depending on the distance from the laser radar device 100 to the blades 903.

The signal-combining circuit 23 generates the burst linear-phase-modulation signal having a pulse width of 500 ns and the two frequency components illustrated in FIG. 11C by providing the first linear-phase-modulation signal illustrated in FIG. 11A and the second linear-phase-modulation signal illustrated in FIG. 11B.

The third signal generator 24 generates a pulse generation signal for performing intensity modulation on the transmission light output from the optical phase modulator 3 and applies the pulse generation signal to the optical intensity modulator 4. An example of the pulse generation signal is illustrated in FIG. 11D. The pulse generation signal illustrated in FIG. 11D is an intensity modulated signal which allows the pulsed light output from the optical intensity modulator 4 to have a light intensity within a range of output time from 0 ns to 500 ns. In the example illustrated in FIG. 11D, an intensity modulated signal for generating pulsed light for use in wind measurement is generated in a range H of output time from 0 ns to 490 ns. In addition, an intensity modulated signal for generating pulsed light for use in measurement of rotation of the blades is generated in a range I of output time from 490 ns to 500 ns (the range I corresponds to the trailing edge region of the pulsed light).

Figure 12:
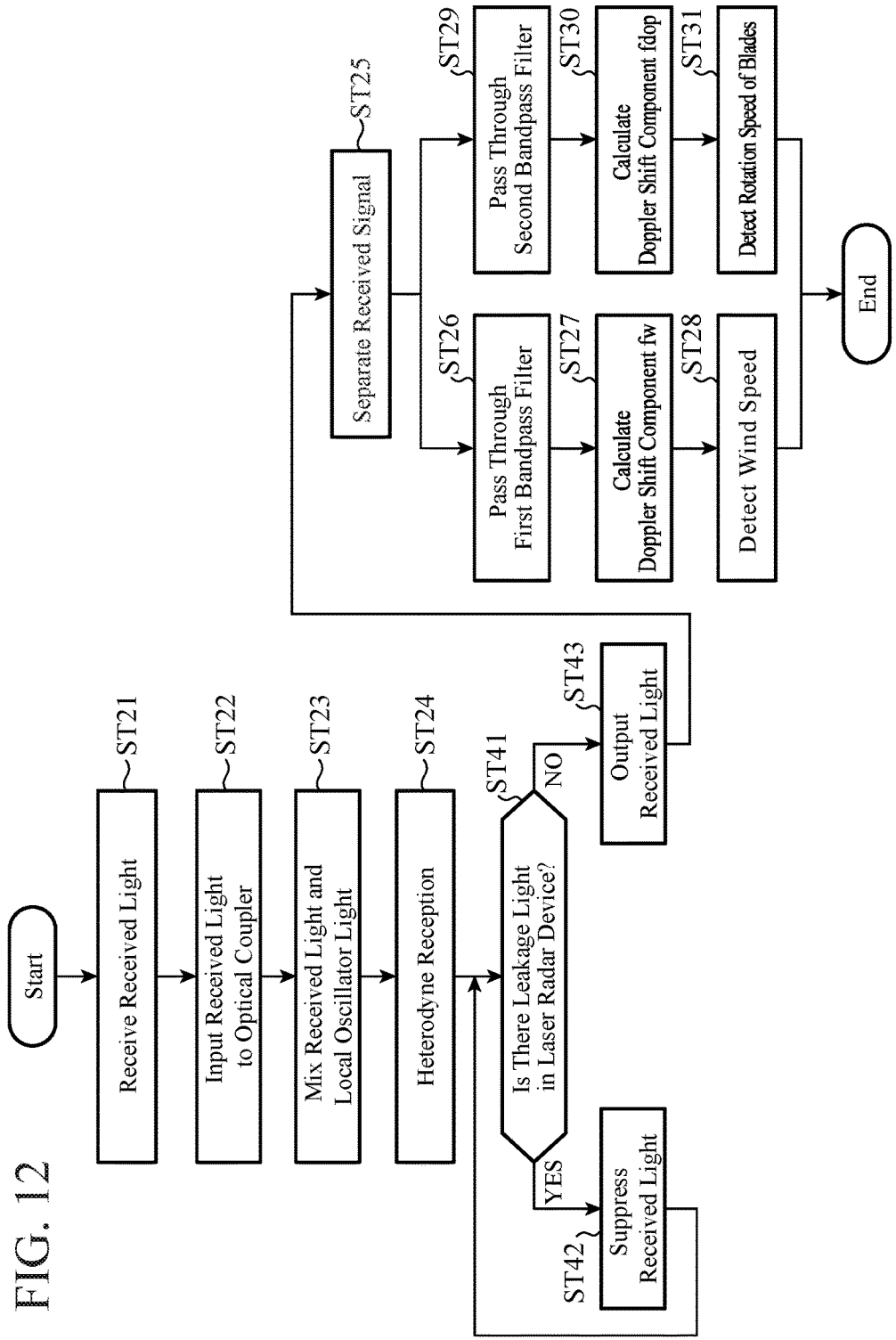
FIG. 12 is a flowchart illustrating operations for received light in the laser radar device according to the second embodiment.

Next, the operation of the laser radar device 100a of the second embodiment is described. The overall operation of the laser radar device 100a of the second embodiment is the same as the processing illustrated in the flowchart of FIG. 4, and thus descriptions thereof are omitted. With reference to the flowchart of FIG. 12, the processing operation on received light of the laser radar device 100a according to the second embodiment is described. The same step as that of the laser radar device 100a according to the first embodiment is denoted by the same symbol as that used in FIG. 7 and descriptions thereof are omitted or simplified.

When the optical receiver 12 heterodyne-receives first received light and second received light (step ST24), the RF switch 38 refers to the frequency of an electrical signal input from the optical receiver 12, and determines whether the received signal is leakage light in the laser radar device 100a (step ST41). If the received light is leakage light in the laser radar device 100a (step ST41: YES), the RF switch 38 suppresses the received light (step ST42) and returns to the processing of step ST41. On the other hand, if the received light is not leakage light in the laser radar device 100a (step ST41: NO), the RF switch 38 outputs the received light toward the RF separation coupler 31 (step ST43).

The RF separation coupler 31 separates an electrical signal indicating the received light input in step ST43, into two signals to be output to a first bandpass filter 32 and a second bandpass filter 35 (step ST25). Thereafter, the same processing as the processing from step ST26 to step ST31 is performed, and the processing is terminated.

FIGS. 13A to 13D are diagrams each illustrating an image of time-series data of one of modulated signals and received signals of the laser radar device 100a according to the second embodiment. FIG. 13A is the same as the time-series data of the modulation signal illustrated in FIG. 11C, and FIG. 13B is the same as the time-series data of light intensity illustrated in FIG. 11D. FIG. 13C is a diagram illustrating the intensity of a received signal of the laser radar device 100a, and FIG. 13D is a diagram illustrating the received signal of the laser radar device 100a by frequency. In FIG. 13A, a horizontal axis represents time, and a vertical axis represents phase. In FIGS. 13B and 13C, a horizontal axis represents time, and a vertical axis represents intensity. In FIG. 13D, a horizontal axis represents time, and a vertical axis represents frequency.

As illustrated in FIGS. 13A and 13B, pulsed light for wind measurement is emitted in a range of output time from 0 ns to 490 ns, and pulsed light for measurement of rotation of the blades is emitted in a range from 490 ns to 500 ns. A time period of 20 ns in FIG. 13 corresponds to a distance of 2 m and represents a time period from emission of pulsed light emitted from the laser radar device 100a to reception of reflected light reflected by the blades 903 of the wind turbine by the laser radar device 100a.

FIGS. 13A and 13B are the same data as that in FIGS. 11C and 11D, and thus descriptions thereof are omitted.

Leakage light J illustrated in FIG. 13C represents leakage light in the laser radar device 100a, which is light emitted to an area other than an area to be irradiated, a received signal K represents reflected light reflected by the blades 903 of the wind turbine, and a received signal L represents scattered light scattered by aerosol in the atmosphere.

FIG. 13D illustrates each of leakage light and the received signal as components having the modulation frequency f1 and the modulation frequency f2 separately. Leakage light Ja represents leakage light having the modulation frequency f1 in the leakage light J, and leakage light Jb represents a received signal having the modulation frequency f2 in the leakage light J. Since the received signal K indicates reflected light reflected by the blades 903 of the wind turbine, the received signal K has a modulation frequency of f2+fdop and is shifted to a high frequency side with respect to the leakage light Ja. Since the received signal L indicates scattered light scattered by aerosol, a modulation frequency of f1+fw is obtained.

In FIG. 13D, leakage light Jb having the modulation frequency f2 is received in the section ranging from 490 ns to 500 ns, and reflected light reflected by the blades 903 and scattered light scattered by aerosol are received in its subsequent region. Thus, providing the RF switch 38 for suppressing received light having the modulation frequency f1 and the modulation frequency f2 in the range of 0 ns to 500 ns enables suppressing the influence of leakage light in the laser radar device 100a.

In FIG. 13D, actually, since the reception of the received signal L of the scattered light starts from the moment when reception of the leakage light Ja starts, the received signal K and the received signal L may overlap. Even in this case, since frequency components of the received signal K and received signal L are different, frequency separation can be performed.

As described above, the configuration according to the second embodiment is provided, which includes the modulator 20 that generates the first linear-phase-modulation signal corresponding to the modulation frequency f1 is generated in the main region within one pulse of transmission light and generates the second linear phase modulation signal corresponding to the modulation frequency f2 in the trailing edge region, and the signal processor 30 including the RF switch 38 that suppresses received light having a predetermined frequency from received light input from the optical receiver 12. This configuration therefore allows for suppression of the influence of leakage light in the laser radar device, and for measurement of rotation of the blades 903 using received light immediately after the trailing edge region of pulses. As a result, it is possible to measure the speed of rotation of the wind turbine and to measure the wind speed at the position of the wind turbine only by the laser radar device, thereby implementing a high resolution of the laser radar device.

Third Embodiment

In the first embodiment described above, the configuration including the optical switch 7 that separates a transmission signal output from the optical circulator 6 is described. In the third embodiment, a configuration is described in which a transmission signal is separated by a filter.

Figure 14:
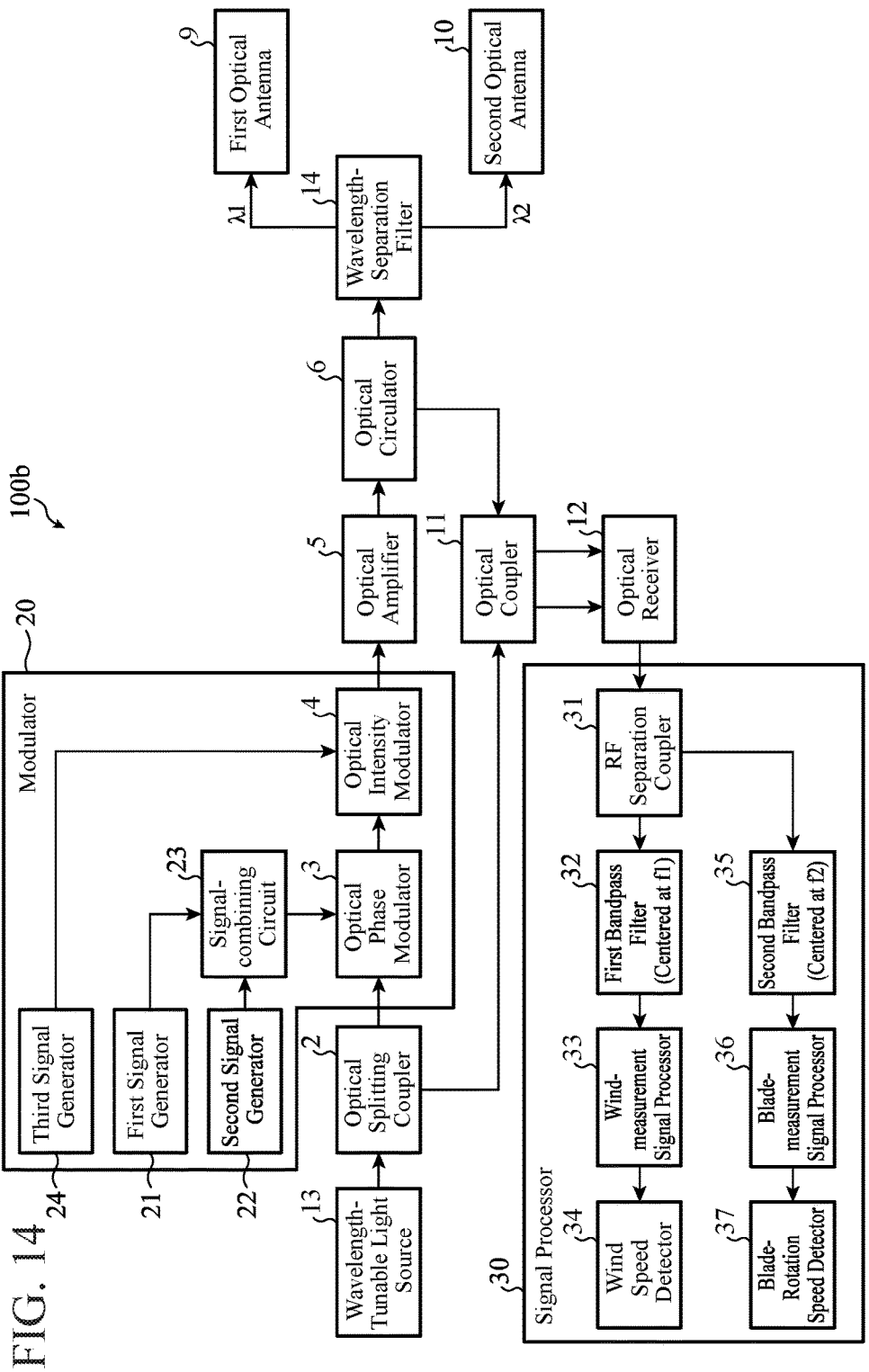
FIG. 14 is a block diagram illustrating a configuration of a laser radar device according to a third embodiment.

FIG. 14 is a block diagram illustrating a configuration of a laser radar device 100b according to the third embodiment.

In the third embodiment, a wavelength-tunable light source 13 and a wavelength-separation filter 14 are included in place of the reference light source 1, the optical switch 7, and the optical-switch controlling signal generator 8 included in the laser radar device 100 illustrated in the first embodiment. In the following description, the same symbol as that used in the first embodiment is provided to the same or a corresponding component as that of the laser radar device 100 according to the first embodiment, and the explanation thereof is omitted or simplified.

In the laser radar device 100b of the third embodiment, the wavelength-tunable light source 13 is employed as a reference light source, and a line-of-sight direction is switched on the basis of a wavelength in the wavelength-separation filter 14. For example, an integrable tunable laser assemble (ITLA) or the like can be applied as the wavelength-tunable light source 13, and a wavelength of output light is switched from a wavelength $\alpha_1$ to a wavelength $\alpha_2$ or from the wavelength $\alpha_2$ to the wavelength $\alpha_1$. For example, dense wavelength division multiplexing (DWDM) or the like can be applied to the wavelength-separation filter 14, and only the wavelength $\alpha_1$ is coupled to a first optical antenna 9, and the other wavelength (for example, wavelength $\alpha_2$) is coupled to a second optical antenna 10. In this manner, by switching the wavelength of the wavelength-tunable light source 13 applied as the reference light source, a line-of-sight direction is switched.

As described above, according to the third embodiment, the wavelength-tunable light source 13 that switches the wavelength of output light and the wavelength-separation filter 14 that connects one of the switching wavelengths of the wavelength-tunable light source 13 to the first optical antenna 9 and connects the other wavelength to the second optical antenna 10 are included, an optical switch for separating transmission light becomes unnecessary, thereby implementing downsizing of the laser radar device. Since mechanical separation operation is not used for separation of transmission light, reliability of the separation of transmission light can be improved.

Fourth Embodiment

The laser radar devices 100, 100a, and 100b of the first to the third embodiments described above can be applied to, for example, a wind turbine control system or other systems. In the fourth embodiment, a case where the laser radar device 100 of the first embodiment is applied to a wind turbine control system is described.

Figure 15:
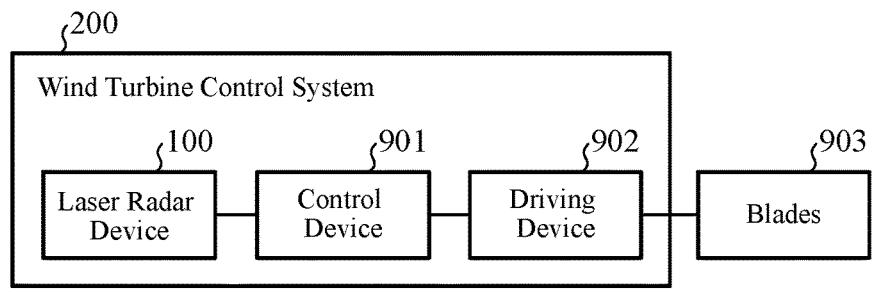
FIG. 15 is a block diagram illustrating a configuration of a wind turbine control system according to a fourth embodiment.

FIG. 15 is a functional block diagram illustrating a configuration of a wind turbine control system 200 according to a fourth embodiment.

The wind turbine control system 200 includes the laser radar device 100, a control device 901, and a driving device 902. The wind turbine control system 200 is mounted on the top of the wind turbine 900 illustrated in FIG. 1, for example, and has a function of assisting rotation startup of the blades 903 of the wind turbine 900.

The laser radar device 100 is the laser radar device having the configuration and functions described in the first embodiment and detects the wind speed of the wind coming to the wind turbine 900 and the rotation of the blades 903 of the wind turbine 900. The detection result in the laser radar device 100 is output to the control device 901. The control device 901 refers to the detection result input from the laser radar device 100 and determines whether to perform startup assistance for rotating the blades 903 on the basis of the rotation state of the blades 903 and the wind speed. The control device 901 outputs, to the driving device 902, a control signal for supplying or shutting off a current for startup assistance of the blades 903 on the basis of the determination result. The driving device 902 drives the blades 903 on the basis of the control signal input from the control device 901.

Figure 16:
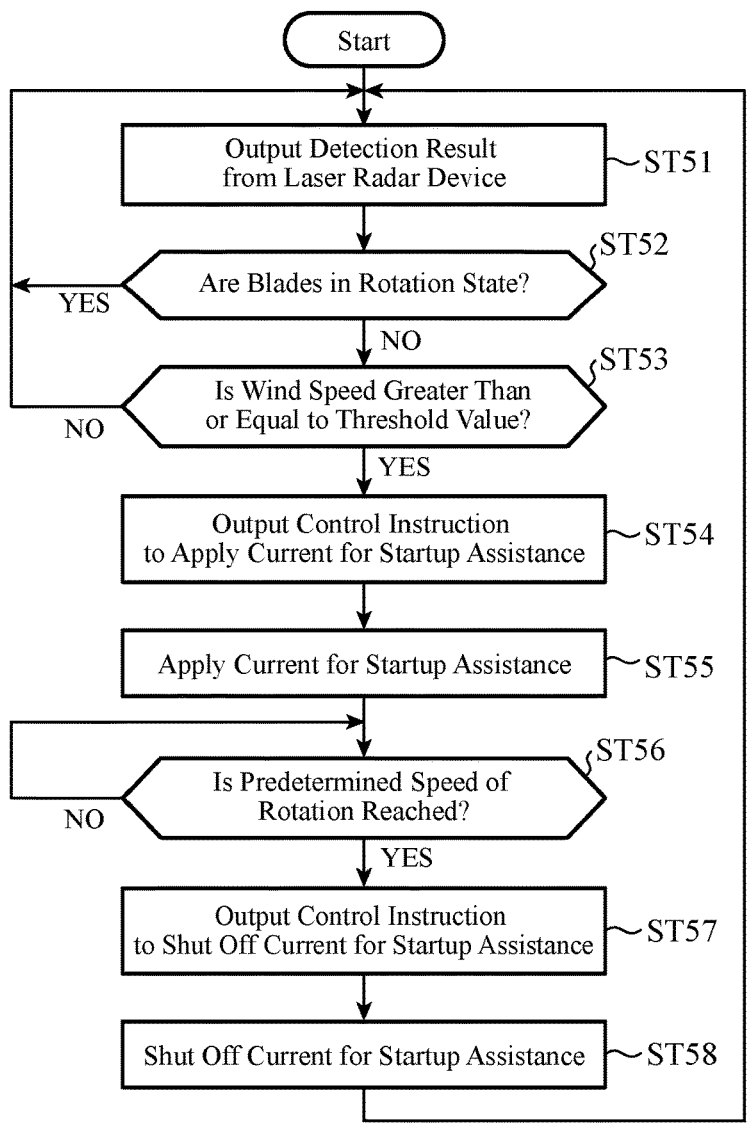
FIG. 16 is a flowchart illustrating the operation of the wind turbine control system according to the fourth embodiment.

FIG. 16 is a flowchart illustrating the operation of the wind turbine control system 200 according to the fourth embodiment.

When the laser radar device 100 outputs the wind speed and the rotation speed of the blades 903 detected according to the flowchart illustrated in FIG. 4 as detection results (step ST51), the control device 901 refers to the detection result and determines whether the blades 903 are rotating (step ST52). In the determination of the rotation state in step ST52, it may be determined that the blades 903 are not rotating when the rotation speed of the blades 903 is zero, or it may be determined that the blades 903 are not rotating when the rotation speed of the blades 903 is less than equal to a threshold value.

If the blades 903 are rotating (step ST52: YES), the flow returns to the process of step ST51 and the processing described above is repeated. On the other hand, if the blades 903 are not rotating (step ST52: NO), the control device 901 further determines whether the wind speed at the position of the wind turbine is greater than or equal to the threshold value by referring to a detection result (step ST53). If the wind speed is not greater than or equal to the threshold value (step ST53: NO), the flow returns to the processing of step ST51 and repeats the processing described above. On the other hand, if the wind speed is greater than or equal to the threshold value (step ST53: YES), the control device 901 outputs a control signal for instructing to apply a current for assisting startup of the blades 903 (step ST54). The driving device 902 applies a current for startup assistance on the basis of the control signal output in step ST54 (step ST55).

When startup assistance of the blades 903 is initiated, the control device 901 refers to a driving state of the driving device 902 and determines whether rotation of the blades 903 has reached a predetermined speed of rotation (step ST56). If the rotation of the blades 903 has not reached the predetermined speed of rotation (step ST56: NO), the process returns to the determination processing of step ST56. On the other hand, if the rotation of the blades 903 has reached the predetermined speed of rotation (step ST56: YES), the control device 901 outputs a control signal instructing to shut off current for startup assistance (step ST57). The driving device 902 shuts off the current for startup assistance on the basis of the control signal output in step ST57 (step ST58). Thereafter, the flowchart returns to the processing of step ST51 and the processing described above is repeated.

As described above, the wind turbine control system 200 refers to the detection result in the laser radar device 100 and, when the blades 903 are not rotating state and wind having a wind speed greater than or equal to the threshold value is blowing, assists rotation of the blades 903 by applying a current for assisting rotation startup of the blades 903. While the current for assisting rotation of the blades 903 is being applied, the control device 901 monitors the driving state of the driving device 902, determines that the rotation of the blades 903 is stabilized when a current for rotating the blades 903 in a constant speed of rotation is applied, and performs control to shut off the current for startup assistance.

As described above, the configuration according to the fourth embodiment is provided, which includes the laser radar device 100 that detects the wind speed at the position of the wind turbine and the rotation speed of the blades 903 within one pulse of transmission light, the control device 901 that controls application of a current for startup assisting of the blades 903 on the basis of the detection result in the laser radar device 100, and a driving device 902 that drives the startup assistance of the blades 903 on the basis of a control instruction of the control device 901. This configuration therefore allows for efficient start-up process of rotation of the blades 903 in the wind turbine 900 when a gentle wind is blowing to the wind turbine. This enables an improvement of the power generation capability of a wind turbine.

In the fourth embodiment described above, the laser radar device 100 described in the first embodiment is applied to the wind turbine control system 200; however, the laser radar device 100a described in the second embodiment or the laser radar device 100b described in the third embodiment may be applied.

Moreover, in the first to the fourth embodiments described above, the example where the laser radar device is applied to a wind turbine is described; however, the present disclosure is also applicable to a structure including a rotating body that rotates by wind power.

In addition to the above, the present disclosure may include a flexible combination of the respective embodiments, a modification of any component of the respective embodiments, or omission of any component in the respective embodiments within the scope of the present disclosure.

INDUSTRIAL APPLICABILITY

A laser radar device according to the present disclosure is capable of analyzing the frequency of reflected light at a short distance point and reflected light at the long-distance point within one pulse of transmission light and thus is suitable for a wind power generation device and other devices that perform control by detecting two control measured values of the wind speed at the position of the wind turbine and rotation of the wind turbine.

REFERENCE SIGNS LIST

1: Reference light source; 2: Optical splitting coupler; 3: Optical phase modulator; 4: Optical intensity modulator; 5: Optical amplifier; 6: Optical circulator; 7: Optical switch; 8: Optical-switch controlling signal generator; 9: First optical antenna; 10: Second optical antenna; 11: Optical coupler; 12: Optical receiver; 13: wavelength-tunable light source; 14: Wavelength-separation filter; 20: Modulator; 21: First signal generator; 22: Second signal generator; 23: Signal-combining circuit; 24: Third signal generator; 30, 30a: signal processors; 31: RF separation coupler; 32: First bandpass filter; 33: Wind-measurement signal processor; 34: wind speed detector; 35: Second bandpass filter; 36: Blade-measurement signal processor; 37: Blade-rotation speed detector; 100, 100a, 100b: Laser radar device; 200: Wind turbine control system; 900: Wind turbine; 901: Control device; 902: Driving device; and 903: Blade.

The invention claimed is:

1. A laser radar device comprising:
a reference light source to emit laser light;
an optical splitting coupler to split the laser light into transmission light and local oscillation light;
an optical phase modulator to perform phase modulation of the transmission light on a basis of a first linear-phase-modulation signal having a first frequency component and a second linear-phase-modulation signal having a second frequency component in a time section that is different from a time section of the first linear-phase-modulation signal;
an optical intensity modulator to modulate light intensity of the transmission light subjected to the phase modulation in the optical phase modulator, on a basis of a pulsed-light generation signal for generation of pulsed light;

an optical antenna to emit toward a space the transmission light whose light intensity is modulated by the optical intensity modulator, and to receive reflected light generated from the emitted transmission light being reflected at a first point and a second point;

an optical receiver to perform heterodyne detection on light generated by mixing the received light received by the optical antenna and the local oscillation light; and a signal processor to separate received signal obtained by the heterodyne detection in the optical receiver on a basis of the first frequency component and the second frequency component, and to perform frequency analysis of the reflected light at the first point and the second point.

2. The laser radar device according to claim 1, wherein the optical phase modulator applies the second linear-phase-modulation signal onto a rising region of the pulsed light to be generated.

3. The laser radar device according to claim 2, wherein a semiconductor optical amplifier is used as the optical intensity modulator.

4. The laser radar device according to claim 2, wherein the signal processor includes:
a wind-measurement signal processor to measure information of wind direction and wind speed at the first point on a basis of the received signal corresponding to the first frequency component;
a wind speed detector to detect a wind speed at the first point from the measured information of wind direction and wind speed;
a rotary-member-measurement signal processor to measure rotation information of a rotary member located at the second point on a basis of the received signal corresponding to the second frequency component; and
a rotation speed detector to detect a rotation speed of the rotary member from the measured rotation information.

5. The laser radar device according to claim 1, wherein:
the optical phase modulator applies the second linear-phase-modulation signal to a trailing edge region of the pulsed light to be generated; and
the signal processor includes an RF switch to suppress leakage light from the laser radar device.

6. The laser radar device according to claim 5, wherein a semiconductor optical amplifier is used as the optical intensity modulator.

7. The laser radar device according to claim 5, wherein the signal processor includes:
a wind-measurement signal processor to measure information of wind direction and wind speed at the first point on a basis of the received signal corresponding to the first frequency component;
a wind speed detector to detect a wind speed at the first point from the measured information of wind direction and wind speed;
a rotary-member-measurement signal processor to measure rotation information of a rotary member located at the second point on a basis of the received signal corresponding to the second frequency component; and
a rotation speed detector to detect a rotation speed of the rotary member from the measured rotation information.

8. The laser radar device according to claim 1, wherein a semiconductor optical amplifier is used as the optical intensity modulator.

9. The laser radar device according to claim 8, wherein:
the optical antenna includes a first optical antenna and a second optical antenna to emit the transmission light; and
the laser radar device comprises an optical switch to switch an optical path for the transmission light modulated by the optical intensity modulator between the first optical antenna and the second optical antenna.

10. The laser radar device according to claim 8, wherein:
the reference light source is a wavelength-tunable light source that emits the laser light having two wavelengths;
the optical antenna includes a first optical antenna to emit the transmission light having a first wavelength in the laser light, and a second optical antenna to emit the transmission light having a second wavelength in the laser light; and
the laser radar device comprises a wavelength-separation filter to separate into the transmission light having the first wavelength and the transmission light having the second wavelength for output to the first optical antenna and the optical second antenna, on a basis of wavelengths of the transmission light modulated by the optical intensity modulator.

11. The laser radar device according to claim 8, wherein the signal processor includes:
a wind-measurement signal processor to measure information of wind direction and wind speed at the first point on a basis of the received signal corresponding to the first frequency component;
a wind speed detector to detect a wind speed at the first point from the measured information of wind direction and wind speed;
a rotary-member-measurement signal processor to measure rotation information of a rotary member located at the second point on a basis of the received signal corresponding to the second frequency component; and
a rotation speed detector to detect a rotation speed of the rotary member from the measured rotation information.

12. The laser radar device according to claim 1, wherein:
the optical antenna includes a first optical antenna and a second optical antenna to emit the transmission light; and
the laser radar device comprises an optical switch to switch an optical path for the transmission light modulated by the optical intensity modulator between the first optical antenna and the second optical antenna.

13. The laser radar device according to claim 12, wherein the signal processor includes:
a wind-measurement signal processor to measure information of wind direction and wind speed at the first point on a basis of the received signal corresponding to the first frequency component;
a wind speed detector to detect a wind speed at the first point from the measured information of wind direction and wind speed;
a rotary-member-measurement signal processor to measure rotation information of a rotary member located at the second point on a basis of the received signal corresponding to the second frequency component; and
a rotation speed detector to detect a rotation speed of the rotary member from the measured rotation information.

14. The laser radar device according to claim 1, wherein:
the reference light source is a wavelength-tunable light source that emits the laser light having two wavelengths;
the optical antenna includes a first optical antenna to emit the transmission light having a first wavelength in the laser light and a second optical antenna to emit the transmission light having a second wavelength in the laser light; and the laser radar device comprises a wavelength-separation filter to separate into the transmission light having the first wavelength and the transmission light having the second wavelength for output to the first optical antenna and the second optical antenna, on a basis of wavelengths of the transmission light modulated by the optical intensity modulator.

15. The laser radar device according to claim 14, wherein the signal processor includes:
  a wind-measurement signal processor to measure information of wind direction and wind speed at the first point on a basis of the received signal corresponding to the first frequency component;
  a wind speed detector to detect a wind speed at the first point from the measured information of wind direction and wind speed;
  a rotary-member-measurement signal processor to measure rotation information of a rotary member located at the second point on a basis of the received signal corresponding to the second frequency component; and
  a rotation speed detector to detect a rotation speed of the rotary member from the measured rotation information.

16. The laser radar device according to claim 1, wherein the signal processor includes:
  a wind-measurement signal processor to measure information of wind direction and wind speed at the first point on a basis of the received signal corresponding to the first frequency component;
  a wind speed detector to detect a wind speed at the first point from the measured information of wind direction and wind speed;
  a rotary-member-measurement signal processor to measure rotation information of a rotary member located at the second point on a basis of the received signal corresponding to the second frequency component; and
  a rotation speed detector to detect a rotation speed of the rotary member from the measured rotation information.

17. A wind turbine control system comprising:
  a wind turbine having blades;
  a laser radar device including:
    a reference light source to emit laser light;
    an optical splitting coupler to split the laser light into transmission light and local oscillation light;
    an optical phase modulator to perform phase modulation of the transmission light on a basis of a first linear-phase-modulation signal having a first frequency component and a second linear-phase-modulation signal having a second frequency component in a time section that is different from a time section of the first linear-phase-modulation signal;
    an optical intensity modulator to modulate light intensity of the transmission light subjected to the phase modulation in the optical phase modulator, on a basis of a pulsed-light generation signal for generation of pulsed light in which the first frequency component and the second frequency component have pulse widths different from each other;
    an optical antenna to emit toward a space the transmission light whose light intensity is modulated by the optical intensity modulator, and to receive reflected light generated from the emitted transmission light being reflected at aerosol in atmosphere and the blades;
    an optical receiver to perform heterodyne detection on light generated by mixing the received light received by the optical antenna and the local oscillation light;
    a wind-measurement signal processor to measure information of wind direction and wind speed at a long-distance position located farther from the blades, on a basis of the received signal corresponding to the first frequency component;
    a wind speed detector to detect a wind speed at the long-distance position from the measured information of wind direction and wind speed;
    a rotary-member-measurement signal processor to measure rotation information of the blades on a basis of the received signal corresponding to the second frequency component; and
    a rotation speed detector to detect a rotation speed of the blades from the measured rotation information;
  a control device to perform control to apply a current for assisting rotation startup of the blades when the blades are not in rotation state and the wind speed is greater than or equal to a threshold value by referring to the wind speed at the long-distance position and the rotation speed of the blades which are detected by the laser radar device; and
  a driving device to apply a current for assisting rotation startup of the blades under control of the control device.

* * * * *